(12) United States Patent
Kienle

(10) Patent No.: US 9,851,238 B2
(45) Date of Patent: Dec. 26, 2017

(54) CONTAINER FILLING DEVICE HAVING AN INDICATOR

(71) Applicant: Robert Kienle, Palm Coast, FL (US)

(72) Inventor: Robert Kienle, Palm Coast, FL (US)

(*) Notice: Subject to any disclaimer, the term of this patent is extended or adjusted under 35 U.S.C. 154(b) by 149 days.

(21) Appl. No.: 14/954,120

(22) Filed: Nov. 30, 2015

(65) Prior Publication Data

US 2016/0377473 A1  Dec. 29, 2016

Related U.S. Application Data

(60) Provisional application No. 62/183,364, filed on Jun. 23, 2015.

(51) Int. Cl.
*G01F 23/56* (2006.01)
*B67C 11/00* (2006.01)
*B67C 11/06* (2006.01)

(52) U.S. Cl.
CPC ............ *G01F 23/56* (2013.01); *B67C 11/066* (2013.01)

(58) Field of Classification Search
CPC .......... G01F 23/30; G01F 23/56; G01F 23/58; G01F 23/64; G01F 23/66; G01F 23/76; B67C 11/00; B67C 11/06; B67C 11/066
USPC .......... 116/109, 110, 227, 228, 229; 73/294, 73/319, 322; 137/558; 141/95
See application file for complete search history.

(56) References Cited

U.S. PATENT DOCUMENTS

| | | | | |
|---|---|---|---|---|
| 579,649 A | * | 3/1897 | Luckenbach | B67C 11/066 141/202 |
| 615,337 A | * | 12/1898 | Altshul | B67C 11/066 137/421 |
| 855,397 A | * | 5/1907 | Fraley | B67C 11/066 137/421 |
| 883,289 A | * | 3/1908 | Burg | B67C 11/04 141/201 |
| 953,065 A | * | 3/1910 | Smith | B67C 11/063 141/336 |
| 962,674 A | * | 6/1910 | Sendall | B67C 11/02 116/228 |
| 977,372 A | | 11/1910 | Crane | |
| 994,272 A | | 6/1911 | Parker | |

(Continued)

FOREIGN PATENT DOCUMENTS

JP         201317718 A   *  9/2013  ............. G01F 23/58

OTHER PUBLICATIONS

FloTool Catalog; "Funneling Higher Profits", pp. 10-11; hopkinsmfg.com/catalog/FloTool%20Cat/index.html#p=10.

*Primary Examiner* — R. A. Smith
(74) *Attorney, Agent, or Firm* — Vincent G. LoTempio; Kloss, Stenger & LoTempio; David T. Stephenson

(57) ABSTRACT

A container filling device including a body having a top end, a bottom end, a first opening at the top end, a second opening at the bottom end, and a channel formed there between is provided in an embodiment herein. A diameter of the body at the top end is greater than a diameter of the body at the bottom end, and a rod component is disposed within the channel and is slidable within the channel, the rod component having a first end and a second end, an indicator element is disposed toward the first end of the rod component and a contact element is disposed toward the second end, wherein upon filling the container with a fluid, the contact element remains at the surface of the fluid, and the indicator element visually indicates the level of the fluid in the container.

11 Claims, 4 Drawing Sheets

(56) References Cited

U.S. PATENT DOCUMENTS

| | | | | |
|---|---|---|---|---|
| 1,023,012 A | * | 4/1912 | Gilbret | B67C 11/066 137/411 |
| 1,243,587 A | * | 10/1917 | Burkett | B67C 11/02 141/95 |
| 1,290,968 A | * | 1/1919 | Gillette | F17C 5/06 141/201 |
| 1,293,575 A | * | 2/1919 | Tapman, Jr. | B67C 11/066 137/433 |
| 1,486,078 A | * | 3/1924 | Dumont | B67C 11/063 141/204 |
| 1,664,266 A | | 7/1926 | Rio | |
| 2,689,651 A | * | 9/1954 | Horsdal | B67C 11/02 141/95 |
| 2,715,488 A | * | 8/1955 | Conlon | B67C 11/063 137/416 |
| 4,712,595 A | | 12/1987 | Wilson | |
| 4,806,902 A | | 2/1989 | Gana | |
| 4,901,776 A | * | 2/1990 | Attinello | B67C 11/02 116/228 |

* cited by examiner

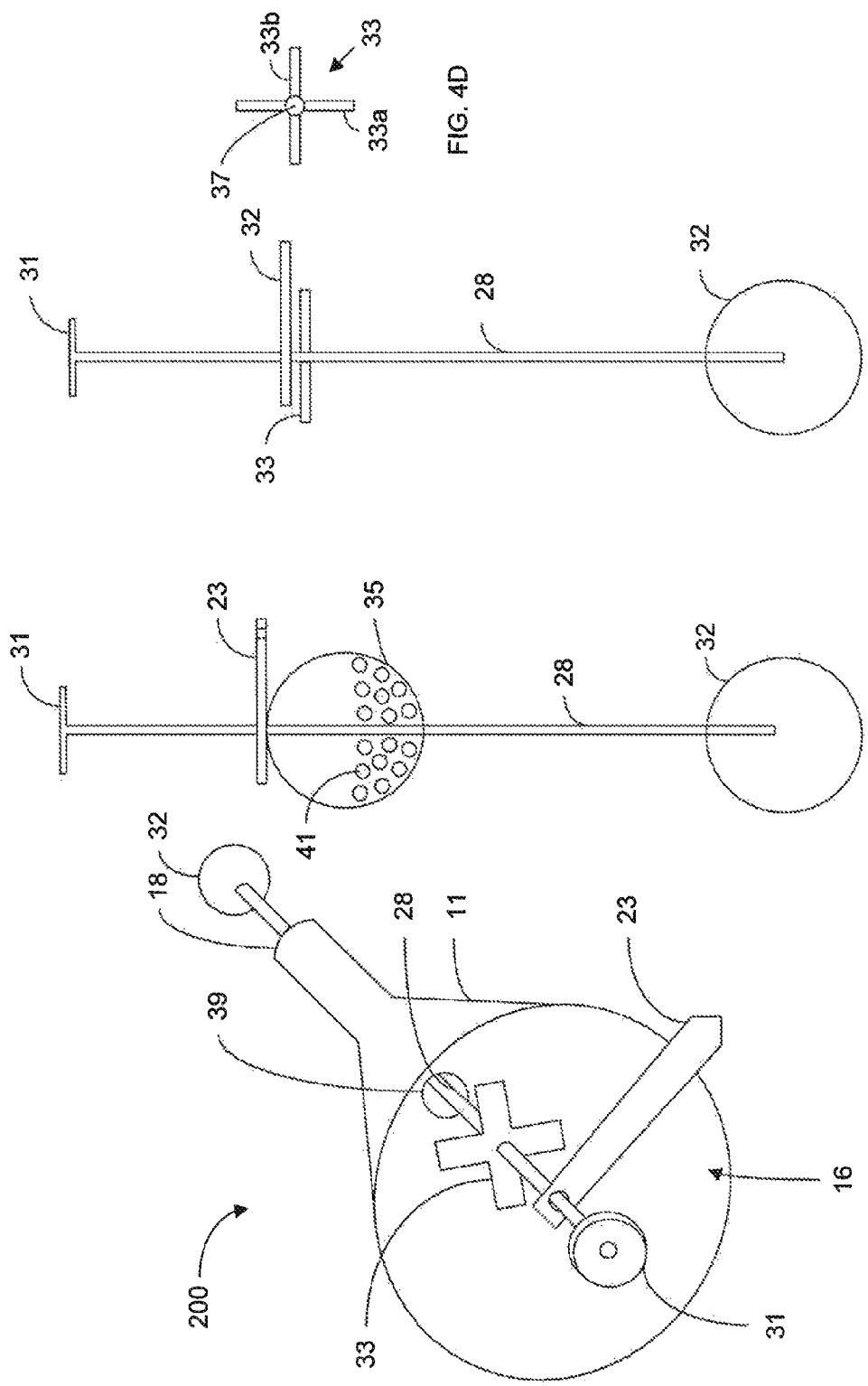

CONTAINER FILLING DEVICE HAVING AN INDICATOR

FIELD OF INVENTION

The present disclosure is directed to devices and methods for filling a container with a fluid using an indicator.

BACKGROUND

Filling containers with fluids typically requires a significant amount of concentration and focus to prevent overfilling and spillage of the fluid from the container during filling. Oftentimes it is difficult to determine when the fluid has reached the top of a container during filling of that container. Consequently, in the process of filling these containers, they tend to overflow.

SUMMARY

In some non-limiting embodiments described herein, a container filling device including a body having a top end, a bottom end, a first opening at the top end, a second opening at the bottom end, and a channel formed there between is provided in an embodiment herein. A diameter of the body at the top end is greater than a diameter of the body at the bottom end, and a rod component is disposed within the channel and is slidable within the channel, the rod component having a first end and a second end, an indicator element is disposed toward the first end of the rod component and a contact element is disposed at the second end, wherein upon filling the container with a fluid, the contact element remains at the surface of the fluid, and the indicator element visually indicates the level of the fluid in the container.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 4A is a perspective view of another embodiment of a container filling device.

FIG. 4B is a side view of an embodiment of a component of a container filling device.

FIG. 4C is a side view of another embodiment of a component of a container filling device.

FIG. 4D is a top view of an embodiment of a portion of the component shown in FIG. 4C.

DETAILED DESCRIPTION

Figure 1A:
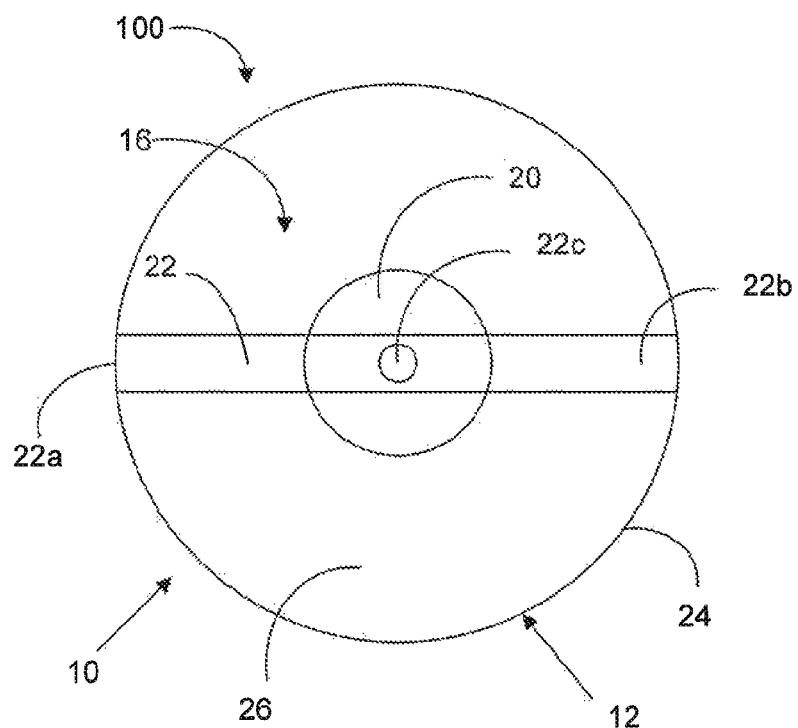
FIG. 1A is a top end view of an embodiment of a container filling device showing an embodiment of an optional rod alignment component.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another.

The modifier "about" used in connection with a quantity is inclusive of the stated value and has the meaning dictated by the context. It is to be noted that all ranges disclosed within this specification are inclusive and are independently combinable.

The term "fluid" as used herein, includes a solid, a liquid, or a gas.

The term "adjacent" as used herein, includes near, at, or within a close proximity thereto.

FIG. 1A includes a top end view of an embodiment of a container filling device 100 having a body 10 including a top end 12, a bottom end 14 (not shown) a first opening 16 at the top end 12 and a second opening 18 (not shown) at the bottom end 14. The top end 12 of the body 10 may include an inverted truncated conical shape, and the bottom end 14 may include a cylindrical configuration. A channel 20 is disposed between the first opening 16 and the second opening 18. The device 100 includes an embodiment of an optional rod alignment component 22 shown as extending from a first edge 24 of the body 10 at the top end 12. The rod alignment component 22 includes a first end 22A and a second end 22B, and an opening 22C for receiving a rod component (not shown) of the device 100. The rod alignment component 22 may be centered on the device 100 with the opening 22C concentrically aligned with the first and second openings, 16, 18. The rod alignment component 22 is configured to receive at least a portion of the rod component 28 (shown in FIG. 1B) within the opening 22C, so as to align the rod component 28 in a generally perpendicular position relative to a longitudinal horizontal axis (x) of the top end of the body 10 (horizontal axis shown in FIG. 1B). An inner surface 26 of the body is shown in the top end view of FIG. 1A.

Figure 1B:
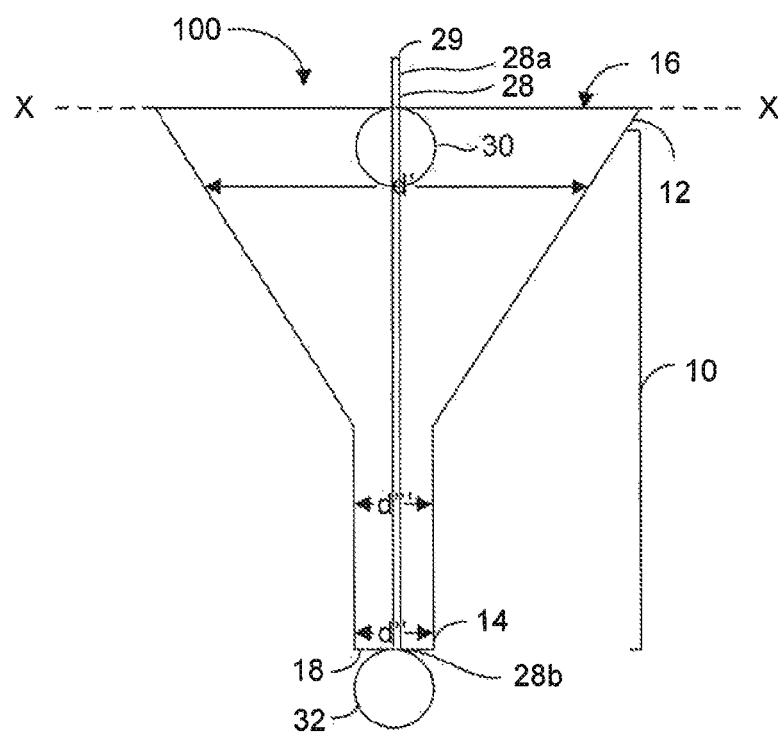
FIG. 1B is a side view of the embodiment of a container filling device provided in FIG. 1A.

FIG. 1B is a side view of the embodiment of a container filling device 100 provided in FIG. 1A including the rod component 28. The rod component 28 includes, in a non-limiting embodiment, a first end 28A and a second end 28B.

The first end 28A of the rod component is adjacent to the first opening 16, and the second end 28B is adjacent to the second opening 18. A first diameter d' of the body 10 near the top end 12 may be larger than a second diameter d" of the body 10 adjacent to the bottom end 14, in a non-limiting embodiment as shown. In a non-limiting embodiment, the rod component 28 may include an indicator element 30 disposed toward the first end 28A, and a contact element 32 disposed toward the second end 28B. In one non-limiting embodiment, the contact element 32 may include an element having buoyancy in a liquid. In another non-limiting embodiment, the contact element 32 or the indicator element 30 may include a spherical shape, a hexagonal shape, a square shape, a triangular shape, or any other shape known to those skilled in the art. In a further non-limiting embodiment, the shape of the contact element 32 may correspond to the shape of the second opening 18.

In a further non-limiting embodiment, the contact element 32 may be configured to contact a surface of a fluid in a container when the device 100 is placed within a container to fill the container with the fluid, wherein when the fluid level in the container reaches the mouth of the container, the contact element 32 abuts the second opening 18 of the device 100 to indicate to a user that the fluid has reached at or near the top of the container to prevent a user from over-filling the container with the fluid. In a further non-limiting embodiment, the contact element 32 is configured to contact the bottom end 28B of the device 100 such that when the container has been filled using the device 100, the contact element 32 rests on the surface of the fluid in the container, and at least a portion of the contact element 32 contacts the bottom end 28B of the device 100.

The indicator element 30 on the rod component 28 may provide a visual guide to a user of the device 100 to prevent overfilling of the container. Alignment of the indicator element 30 with an indicator alignment component may indicate to a user when the container has been substantially or completely filled with a fluid. This alignment includes, but is not limited to horizontal alignment along the horizontal axis (x) shown in FIG. 1B, for example. The indicator alignment component may include a device, such as a measuring component removably associated or permanently associated with the device 100 such as rod alignment component 22' (shown in FIG. 1A), or alignment component 23 (shown in FIG. 4A), or may include, in a non-limiting embodiment, the first edge 24 of the body, or another portion of the body 10 of the device 100, for example.

A third diameter d'" may be provided between the first diameter d' and second diameter d" of the device 100, wherein the third diameter d'" maybe smaller than the diameter of the indicator element 30. This difference in diameter would prevent the rod component 28 from being released from the device 100 through the second opening 18, in one embodiment.

In another non-limiting embodiment, the diameter of the contact element 32 may be greater than the second diameter d" of the device 100 to prevent the rod component from being released from the device 100 via the first opening 16. In these non-limiting embodiments, the varying diameters described herein may serve to maintain the rod component 28 within the device 100 during, before, and after use of the device 100. As shown in FIG. 1B, in a non-limiting embodiment, the rod component 28 may further include a stopper 29 disposed at or near the first end 28A. In one non-limiting embodiment, when the stopper 29 is in contact with the rod alignment component 22 (shown in FIG. 1A) fluid may pass through the device 100 from the inverted truncated conical shaped portion of the body through the cylindrically shaped portion of the body, and thus fluid flow will not be restricted by the indicator element 30. In another embodiment, the indicator element 30 may include a porous material, or may include openings in the element to allow fluid to pass through the indicator element 30.

As shown in FIG. 1B, walls of the device 100 may include indentations, in non-limiting embodiments, to provide additional support to the device 100. For example, deformations in the wall of the inverted truncated conical portion of the device 100 are shown in FIG. 1B. These deformations or indentations provide additional strength to the integrity of the device 100, in non-limiting embodiments.

Figures 2A, 2B, 2C:
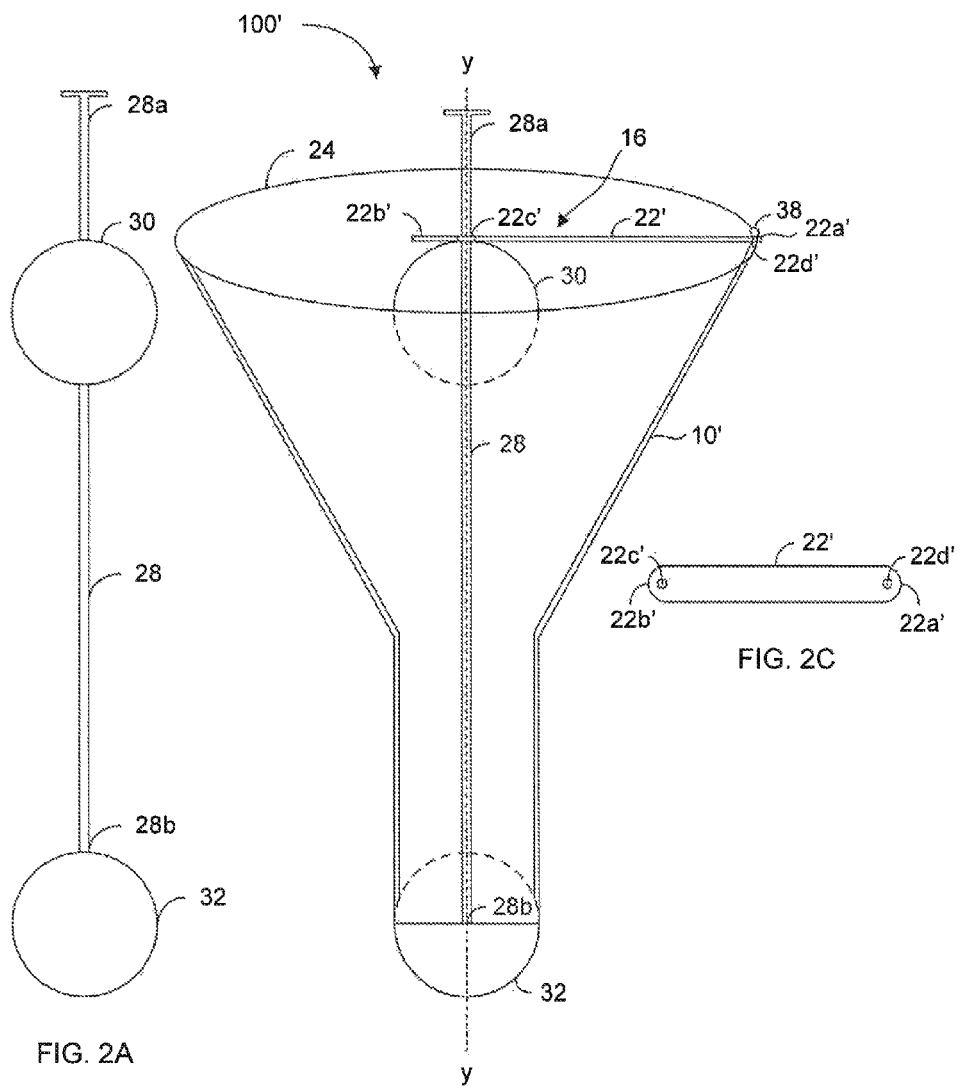
FIG. 2A is a side view of an embodiment of a rod component as described herein.
FIG. 2B is a side view of an embodiment of a container filling device.
FIG. 2C is a side view of another embodiment of an optional rod alignment component shown in the device embodiment of FIG. 2B.

FIG. 2A includes a side view of an embodiment of the rod component 28 as described herein including a first end 28A, a second end 28B, an indicator element 30 disposed toward the first end 28A, and a contact element 32.

FIG. 2B is a side view of another embodiment of a container filling device 100' including the rod component embodiment 28 shown in FIG. 2A having a first end 28A, a second end 28B, an indicator element 30, and a contact element 32. The body 10' of the device 100' includes a post 38 associated with a portion of the first edge 24. An alternative embodiment of a rod alignment component 22' is provided in the non-limiting embodiment of the device 100'. The rod alignment component 22' includes a first end 22A' a second end 22B' a first opening 22C' and a second opening 22D'. The rod alignment component 22' may be secured onto a portion of the first edge 24 of the body 10' via the post 38, wherein either one of the first or second openings 22C', 22D' maybe affixed (either permanently or removably) to the first edge 24 via the post 38, wherein the post 38 is inserted into the first or second opening 22C', 22D' to affix the rod alignment component 22' to the body 10'. The rod alignment component 22' may be snapped onto the post 38, for example, in one non-limiting embodiment. The rod alignment component 22' may then extend into the first opening 16 of the device 100', such that the other of the first or second opening 22C', 22D' is positioned to receive at least a portion of the rod component 28 when the indicator element 30 is aligned with the rod alignment component 22' to prevent or decrease movement of the longitudinal axis of the rod component 28 relative to the (y) axis.

FIG. 2C is a top view of the non-limiting embodiment of the optional rod alignment component 22' in the embodiment of the device 100' of FIG. 2B. The rod alignment component 22' includes a first end 22A' having a second opening 22D' and a second end 22B' having a first opening 22C', wherein either the first or second opening 22C', 22D' may be configured to receive a post or other affixing device known to those skilled in the art, and either the first or second opening 22C', 22D' may be configured to receive at least a portion of the rod component 28 to restrict lateral movement of the rod component 28 relative to the body 10' of the device 100'.

Figure 3:
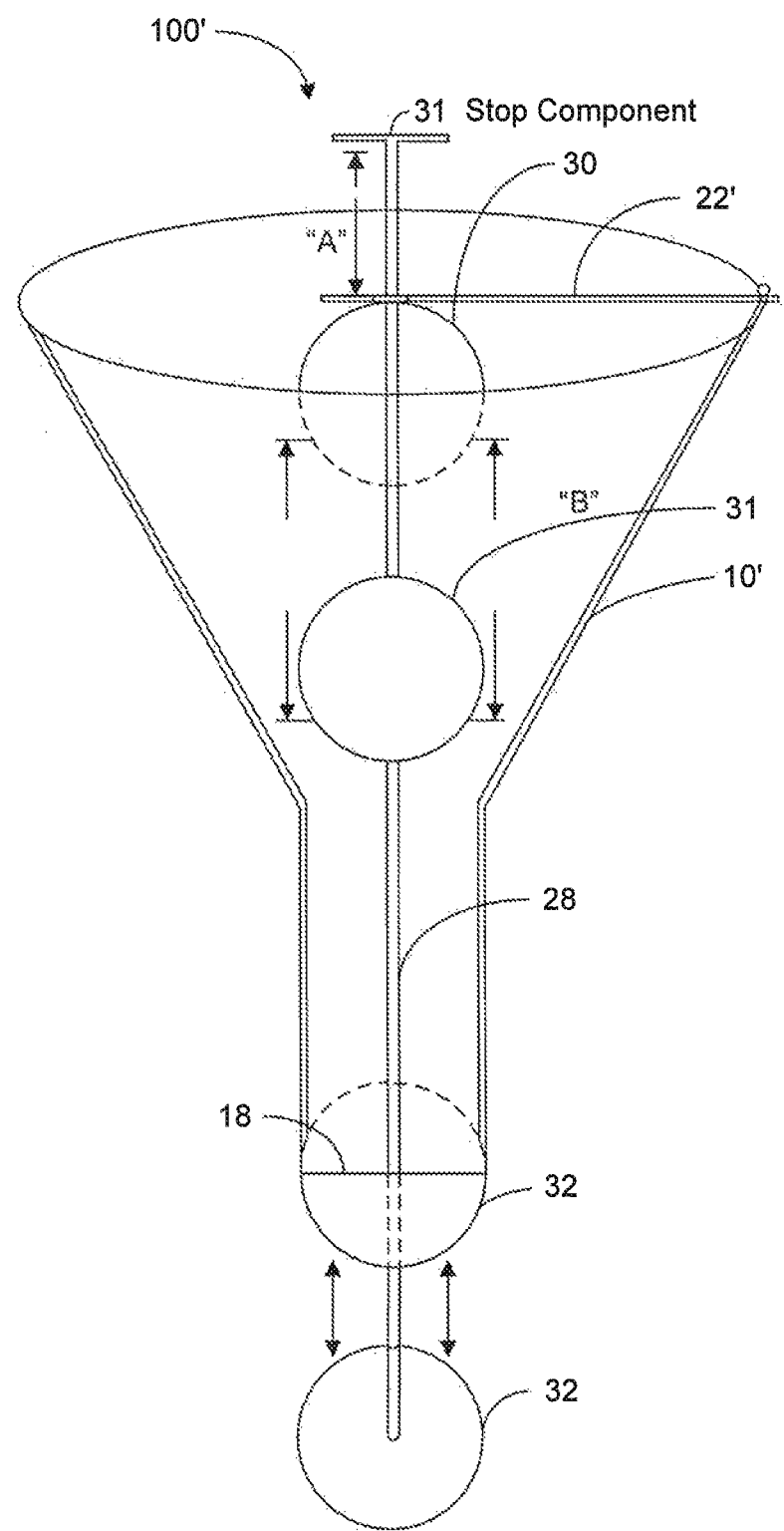
FIG. 3 is a side view of an embodiment of a container filling device.

FIG. 3 provides a side view of an embodiment of the device 100', wherein a range of movement of a stop component 31 is shown as "A" and a range of movement of the indicator element 30 is shown as "B". The range of "A" and "B" are generally similar. In one non-limiting embodiment distance A and B may each include between 1 and 4 inches. The stop component 31 is provided to abut the alignment component 22' when the indicator element 30 is adjacent to a narrowed portion of the body 10'. FIG. 3 shows two positions for indicator 30 and two positions for contact element 32. When the indicator element 30 is adjacent to the narrowed portion of the body 10', and when the stop component 31 abuts the alignment component 22' as shown in FIG. 3, space may be provided on either side of indicator element 30 to allow fluid to pass through the body 10' and out through the second opening 18.

FIG. 4 includes a perspective view of another embodiment of a container filling device 200. The device 200 includes a body 11 having a first opening 16 and a second opening 18, a rod component 28, including a contact element 32 at one end thereof, wherein the contact element 32 is configured to abut the second opening 18 of the body 11, when a container for which the filling device 200 is being used to fill, is nearly full, or is full. At the other end of the rod component 28, a stop component 31 is provided. The stop component 31 may abut against an alignment component 23 to prevent the rod component 28 from falling out of the body 11 when not in use. The device 200 includes an indicator element 33 including at least a first element 33a and a second element 33b, wherein the first and second elements 33a, 33b intersect at an opening 37. The opening 37 allows the indicator element 33 to slide between the alignment component 23 and an opening to a channel 39 between the first and second openings 16, 18, of the body 11. When the device 200 is used to fill a container, and the contact element 32 contacts the second opening 18 of the body 11, the indicator element 33 will abut an under surface of the alignment component 23. This will indicate that the container which was being filled with the device 200 is full, and will help to prevent spillage of the contents being poured into the container via the device 200 by way of this indication.

FIGS. 4B-C include side views of different embodiments of the rod component 28 which may function with the device 100, 100', 200. FIG. 4C includes the rod component 28 having the stop component 31, the alignment component 23, and the indicator element 33, as well as the contact element 32 as shown and described in reference to FIG. 4A. FIG. 4D is a top view of the indicator element 33 embodiment including first and second elements 33a, 33b, which intersect at the opening 37 as shown. FIG. 4B includes another embodiment of an indicator element 35, configured to abut the alignment component 23 when the contact element 32 abuts the second opening 18 of the body 11. The indicator element 35 may include a number of apertures 41 there through, or indentations therein, to lessen the weight of the indicator element 35 and allow it to float efficiently on a surface of the fluid within the body 11 while in use.

In yet a further non-limiting embodiment, markings on the body or on the rod of the device embodiments described herein may be included. The markings may indicate an amount of fluid within the device, in non-limiting embodiments. For example, markings such as ⅛ cup, ¼ cup, ⅓ cup, 1 cup, etc., may be provided on an inner or an outer surface of the body of the device. Alternatively, or in addition, these markings may be provided on the rod of the device to indicate to a user a level of fluid inside the device.

In a further embodiment, a method for filling a container with a fluid is provided. The method includes inserting a container filling device having a body including a top end, a bottom end, and a channel there between, the device having a rod component slidable within the channel, the rod component comprising a first end adjacent to a top end of the body and a second end adjacent to a bottom end of the body, the rod component including an indicator element disposed toward the first end and a buoyant contact element adjacent to the second end, the device comprising an indicator alignment component, wherein when the contact element abuts the bottom end of the body, and the indicator element aligns with the indicator alignment component, into an opening of a container to be filled with a fluid such that the bottom end is in contact with a mouth of the container, and filling the container with a fluid such that the fluid enters the container via the channel until the indicator component aligns with the indicator alignment component.

The method as described herein may prevent spilling of the fluid from the container and/or from the device in one non-limiting embodiment. The method may also prevent filling of the device with fluid from the container in another non-limiting embodiment.

While one or more embodiments of the present invention have been shown and described herein, such embodiments are provided by way of example only. Variations, changes and substitutions may be made without departing from the invention herein. Accordingly, it is intended that the invention be limited only by the spirit and scope of the appended claims. The teachings of all references cited herein are incorporated in their entirety to the extent not inconsistent with the teachings herein.

What is claimed is:

1. A container filling device, the container filling device comprising:
   a body comprising a top end, a bottom end, a first opening at the top end, a second opening at the bottom end, and a channel formed between the first and second openings, wherein a diameter of the body at the top end is greater than a diameter of the body at the bottom end;
   a rod component disposed within the channel and being slidable within the channel, the rod component having a first end and a second end, the first end being adjacent to the top end and the second end being adjacent to the bottom end;
   an indicator element disposed toward the first end of the rod component;
   an indicator alignment component;
   a rod alignment component having a first end and a second end, wherein one of said first and second ends of said rod alignment component is configured to be secured to a portion of the body, and the other of said first and second ends of said rod alignment component is configured to be rotatable about the secured end; and
   a contact element disposed at the second end of the rod component, wherein when at least a portion of the indicator element is aligned with the indicator alignment component, at least a portion of the contact element abuts at least a portion of the bottom end of the body near the second opening.

2. The container filling device of claim 1, wherein the indicator alignment component comprises a first edge of the body.

3. The container filling device of claim 1, wherein the indicator alignment component comprises a measurement device component.

4. The container filling device of claim 1, wherein the contact element comprises a floating element, said floating element comprising buoyancy in a fluid.

5. The container filling device of claim 1, wherein the indicator element is a spherical indicator disposed adjacent to the first end of the rod component.

6. The container filling device of claim 1, further comprising the rod alignment component being configured to receive at least a portion of the rod component and maintain the rod component in a substantially perpendicular position relative to a longitudinal horizontal plane (x) of the top end of the body.

7. The container filling device of claim 6, wherein a post is associated with the first edge of the body, and wherein one of the first and second ends of the rod alignment component comprises a first opening configured to receive at least a portion of the post, wherein the other of the first and second ends is rotatable about the post.

8. The container filling device of claim 7, wherein the other of the first and second ends of the rod alignment component comprises a second opening, the second opening configured to receive at least a portion of the rod component to align the rod component in a generally perpendicular orientation relative to a longitudinal horizontal plane (x) of the top end of the body when the rod component is received there within.

9. The container filling device of claim 1, wherein the contact element is configured to abut the bottom end of the body.

10. The container filling device of claim 9, wherein at least a portion of the contact element is configured to fit within the second opening when the contact element abuts the bottom end of the body.

11. A method for filling a container with a fluid, the method comprising:

inserting a container filling device comprising a body having a top end, a bottom end, and a channel there between, the device having a rod component slidable within the channel, the rod component comprising a first end adjacent to a top end of the body and a second end adjacent to a bottom end of the body, the rod component comprising an indicator element disposed toward the first end and a buoyant contact element adjacent to the second end, the device comprising an indicator alignment component, wherein when the contact element abuts the bottom end of the body, the indicator element aligns with the indicator alignment component, into an opening of a container to be filled with a fluid such that the bottom end is in contact with a mouth of the container; a rod alignment component having a first end and a second end, wherein one of said first and second ends of said rod alignment component is configured to be secured to a portion of the body, and the other of said first and second ends of said rod alignment component is configured to be rotatable about the secured end; and filling the container with a fluid such that the fluid enters the container via the channel until the indicator component aligns with the indicator alignment component.

\* \* \* \* \*